Patented Mar. 18, 1941

2,235,788

UNITED STATES PATENT OFFICE 2,235,788

SUBSTITUTED ARYL GLUCOSIDES OF GLUCOSE ETHYL ETHER ESTERS

Elwood V. White, Moscow, Idaho, assignor to The Dow Chemical Company, Midland, Mich., a corporation of Michigan No Drawing. Application September 13, 1939, Serial No. 294,686

6 Claims. (Cl. 260—210)

This invention relates to new compounds having the general formula

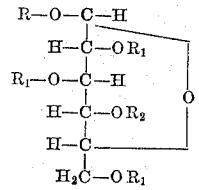

wherein R is an alkyl, aralkyl or an aryl group, at least one of the radicals $R_1$ is an alkyl or aralkyl group, the remainder of the radicals $R_1$ and the radical $R_2$ being acyl groups. Compounds having the configuration and substitution of the type set forth in the foregoing formula are useful as plasticizers for the polysaccharide ethers and for the polysaccharide organic esters to both of which they are related closely in structure. They are also useful as intermediates in the preparation of ethers and ether esters of sorbitol. The new compounds may be made from the halogen acyl glucose ethers, preparation of which is described in my co-pending application, Serial No. 294,685, filed concurrently herewith. The reaction whereby the new compounds may be prepared is illustrated by the following equation:

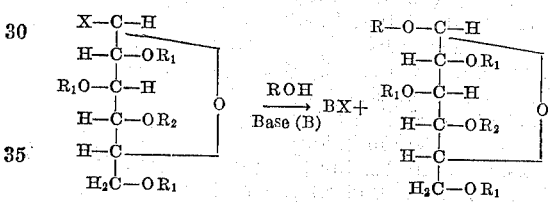

wherein R, $R_1$, and $R_2$ have the previously assigned values, X is chlorine or bromine, and B represents a base capable of reacting with a hydrogen halide to form a metal salt thereof.

The reagent ROH shown in the foregoing equation may be a monohydric phenolic compound such as phenol, tri-bromo-phenol, cresol, ethylphenol, para-tertiary-butyl-phenol, phenylphenol, alpha- or beta-naphthol, or halogen substitution products of the foregoing, or it may be a primary monohydric alcohol such as ethyl, n-butyl, hexyl, lauryl, or similar aliphatic alcohols, or cyclohexanol, menthol, geraniol, benzyl alcohol, or the like.

When phenols are employed to provide the radical R, the reaction is most conveniently carried out utilizing the alkali metal salts of the phenol such, for example, as sodium phenolate. The reaction between the alcohols and the halogen acyl glucose ether proceeds regularly and smoothly in the presence of such bases as the alkaline earth metal carbonates or silver carbonate.

The following examples illustrate the practice of the invention and the preparation of the new compounds:

EXAMPLE 1.—*The preparation of phenyl acetyl ethyl glucoside*

A solution in ethyl ether of bromo acetyl ethyl glucose prepared as described in the aforesaid co-pending application by interaction of ethyl cellulose and acetyl bromide in the presence of glacial acetic acid at about 8°–10° C., was mixed with a 10 per cent solution of sodium phenolate in methanol, the amount of sodium phenolate being equivalent to that of the bromo acetyl ethyl glucose present. The mixture was allowed to stand with occasional agitation at about room temperature while sodium bromide separated from the reaction mixture over a period of about 16 hours. The reaction product in the methanol-ether solution was diluted with an equal volume of ice water to remove the methanol, phenol, and the sodium bromide produced. The new glucoside remained in the separated ethereal layer which was further washed with several portions of ice water until no test for bromide or for phenol could be obtained in the wash water. The ethereal solution was clarified with animal charcoal, filtered, dried over sodium sulphate, and the ether removed by evaporation to leave the product as a pale yellow syrup. The phenyl acetyl ethyl glucoside so obtained had a refractive index of 1.4755 and an ethoxyl content of 40.7 per cent.

EXAMPLE 2.—*The preparation of alpha-naphthyl acetyl ethyl glucoside*

Bromo acetyl ethyl glucose, prepared from 100 grams of ethyl cellulose in a manner described in the foregoing example, was reacted in ethereal solution with an equivalent quantity of sodium alpha-naphtholate dissolved in cold methyl alcohol. The ethyl alcohol solution containing the reactants was allowed to stand with occasional agitation for 20 hours at room temperature. The mixture was diluted with 2 volumes of water and the ethereal layer separated and washed several times with 10 per cent sodium hydroxide and finally with water until no further traces of bromide or naphthol were obtained in the wash liquors. The ethereal solution was decolorized, dried, and the ether evaporated as in the previous example to give in this instance a viscous red syrup having a refractive index of 1.5068 and an ethoxyl value of 33.9 per cent.

*Example 3*

The following table sets forth some of the properties of a number of aryl acetyl ethyl glucosides which have been prepared by reaction of the particular phenol with an appropriate halogen acetyl ethyl glucose in a manner similar to that described in the foregoing examples:

*Table*

| Name of glucoside | Characteristics of glucoside | | | | |
|---|---|---|---|---|---|
| | $N_D^{25°}$ | $OC_2H_5\%$ | | Density 25/4° C. | M. P. |
| | | Found | Calcd. | | |
| | | | | | °C. |
| (4-tert.-butyl 2-phenylphenyl) acetyl ethyl glucoside | 1.5403 | 21.9 | 22.6 | | |
| p-Cresyl acetyl ethyl glucoside | 1.4863 | 30.3 | 29.6 | 1.106 | |
| p-Tert.-octyl phenyl acetyl ethyl glucoside | 1.4881 | | 23.5 | 1.025 | |
| 2.6-dichlor 4-tert.-butyl phenyl acetyl ethyl glucoside | 1.485 | 28.7 | 25.6 | 1.155 (60/4° C.) | |
| 2-hydroxy 3.5-dichlordiphenyl acetyl ethyl glucoside | 1.5055 | 23.6 | 22.0 | | |
| Thymyl acetyl ethyl glucoside | 1.4761 | | 26.8 | 1.067 | |
| p-Tert.-butyl phenyl acetyl ethyl glucoside | 1.4704 | 25.8 | 26.8 | 1.076 | |
| 2.4.6-tribromophenyl 4-acetyl 2.3.6-triethyl glucoside | | 21.1 | 21.7 | | 160 |
| Phenyl 4-acetyl 2.3.6-triethyl glucoside | | | 37.0 | | 68 |

In the foregoing table, it is observed that some of the compounds prepared were found to have higher ethoxyl values than the theoretical based on the average degree of substitution of the ethyl cellulose from which the acyl halogen glucose ether was originally prepared. These differences may be explained in part by the fact that the acetyl ethyl glucosides of the phenols having a statistical average of one or fewer ethyl groups per glucose unit are more readily soluble in alkali and water than are the more highly etherified derivatives. These lowly etherified products may have been separated in part from the remainder of the reaction product by the aqueous alkaline wash to which the crude reaction mixture was subjected, leaving products having a higher statistical average of ethoxyl content than would be predicted from the characteristics of the original ethyl cellulose. In some cases the alkaline wash may have effected partial saponification of the acyl groups, accounting, in these instances, for ethoxyl values in the product higher than expected.

Most of the products obtained are liquids, due in part to the mixed nature of the materials. The remainder are solids of various melting points. All of the new compounds are compatible with ethyl cellulose and similar cellulose ethers, and most of them are particularly useful as plasticizers for such ethers. The high melting solids, only a few of which have been obtained, are compatible with the alkyl ethers of cellulose and serve as substitutes for resinous components in cellulose ether compositions. The principal value of the new compounds is as intermediates in the preparation of new and useful aryl alkyl glucosides by saponification of the acyl groups.

I claim:

1. A compound having the formula

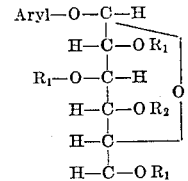

wherein the aryl radical is selected from the class consisting of tertiary alkyl substituted phenyl radicals, polyhalogen-substitution products thereof, and polyhalogen-substituted phenyl radicals, at least one of the radicals $R_1$ is an ethyl group, the remainder of the radicals $R_1$ and the radical $R_2$ being acetyl groups.

2. A compound having the general formula set forth in claim 1, wherein the aryl radical is the p-tertiary-butyl phenyl radical.

3. A compound having the general formula set forth in claim 1, wherein the aryl radical is the 2.6-dichloro-4-tertiary-butyl phenyl radical.

4. 2.6-dichloro-4-tertiary-butyl phenyl, 4-acetyl, 2.3.6-triethyl glucoside.

5. A compound having the general formula set forth in claim 1, wherein the aryl radical is the 2.4.6-tribromophenyl radical.

6. 2.4.6-tribromophenyl 4-acetyl 2.3.6-triethyl glucoside.

ELWOOD V. WHITE.